J. SUGGETT.
Manufacture of Butter from Whey.
No. 60,656. Patented Dec. 18, 1866.
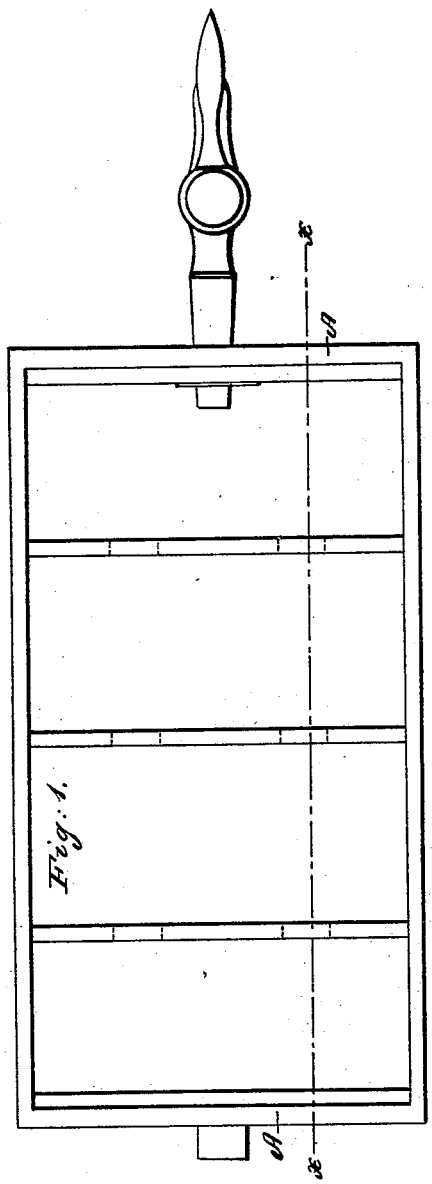
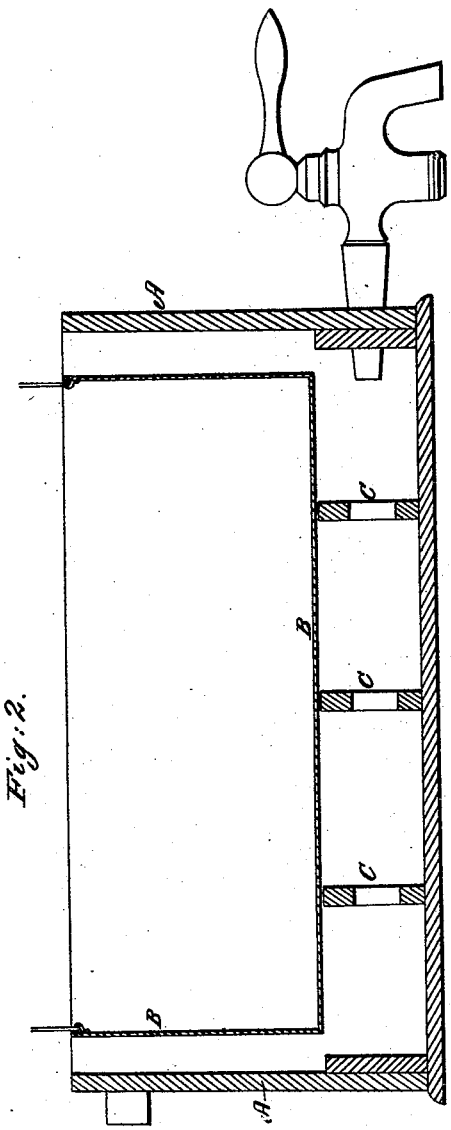
Witnesses:
J. H. Phillips
F. W. Howard
Inventor:
James Suggett

United States Patent Office.

IMPROVEMENT IN MANUFACTURE OF BUTTER FROM WHEY.

JAMES SUGGETT, OF CORTLANDVILLE, NEW YORK.

Letters Patent No. 60,656, dated December 18, 1866.

The Schedule referred to in these Letters Patent and making part of the same.

TO ALL WHOM IT MAY CONCERN:

Be it known that I, JAMES SUGGETT, of the town of Cortlandville, in the county of Cortland, and State of New York, have invented a new and improved process of Manufacturing Butter from Whey; and I do hereby declare that the following is a full and exact description thereof, reference being had to the accompanying drawings, and to the letters of reference marked thereon.

The nature of my invention consists, first, in providing suitable vats, having a cooling-chamber, so arranged that the whey can be rapidly cooled and kept at the proper temperature until the cream rises. Second, in the use of a vat or cooler made of tin, or made of wood and lined with tin, to contain the whey while the cream is rising. Third, in the use of certain ingredients to destroy the effects of the rennet and annetto found in whey, restoring it to a pure and wholesome state, and causing the cream to rise rapidly.

I use a wooden vat, A, in the ordinary shape, and of suitable dimensions, and from one to two feet in depth. At the bottom of the vat I place two or more cross-pieces, $a\ a$, about six inches in height, and perforated with holes, $c\ c\ c$, to allow water to pass through freely. Water is admitted into the vat, A, at one end by means of a pipe, $d$, and is allowed to escape at the other end of the vat through a stop-cock, $e$, into a waste trough. I then construct a vat or cooler, B, made of tin, or made of wood and lined with tin, shaped after the wooden vat, A, but of smaller dimensions, so that when the tin cooler is placed within the wooden vat, A, there will be a space of several inches on the different sides and at the bottom, and forming the cooling-chamber F F. The tin cooler rests upon the cross-pieces, $a\ a$, and is provided with handles, so as to be conveniently removed. As soon as the cheese curd is removed from the whey, the latter is placed in the cooler, B, and cold water immediately introduced into the vat, A, through the pipe, $d$, until the cooling-chamber, F F, is filled nearly to the top. The water should be allowed to pass off rapidly at first, so as to keep the tin cooler, B, surrounded with cold water. By this means the whey is rapidly cooled, which is of the first importance, and thus brought to the right temperature. In the process of making cheese, a brine produced from rennet is used to assist in making the curd. A compound known as annetto is dissolved in water and also put into the milk, for the purpose of coloring the cheese. These ingredients give the whey an unwholesome taste, and if the cream should be taken from it in this state and churned, the butter would be worthless and unfit for use. To destroy the deleterious effects of the rennet and annetto left in the whey, and also to cause the cream to rise rapidly, and restore it to a pure and wholesome condition, I use a solution made of saltpetre, borax, and saleratus. I take a pail containing about ten quarts of pure water, in which I dissolve three ounces of borax, three ounces of saltpetre, and about one ounce of saleratus. To twenty gallons of whey, or thereabouts, I add one quart of this liquid, but if the weather should be cool I use less, say one pint. This liquid is poured in as soon as the whey is placed in the cooler, B, and it is then thoroughly stirred. The whey is allowed to stand in the cooler, B, for a period of fifteen to twenty-two hours, or thereabouts, by which time the cream has been fully extracted from the whey, and is ready for skimming. In skimming the cream I use a tin skimmer, made and shaped like an ordinary tin dust-pan. The cream is churned in the ordinary way, the butter taken out and suffered to stand in cold water for ten or fifteen minutes. The water is then poured off, and the butter worked in the usual way. I use about one pound of salt to six pounds of butter. The butter is then ready for use or for packing, and will be found equal to the best dairy butter manufactured directly from milk.

By the old method the whey was placed in zinc tanks and merely kept in a cool place, and a handful of salt thrown in. This method is open to several objections. It was found that butter made in that way was little else than grease, and unfit to eat. The zinc communicated a black substance to the whey, making the butter full of black streaks. In warm weather the whey was not cooled with sufficient rapidity and became sour, thus spoiling the cream. The salt did not operate to destroy the effect of the rennet and annetto, consequently the cream and the butter made from it tasted of those ingredients, and was unwholesome. Whereas by my process of using a tin vat or cooler, surrounded by cold water, and applying the ingredients I have described, all these objections are obviated, and good butter produced with less labor and expense.

Instead of using water to cool the vat, B, ice may be substituted, or ice may be used in connection with water for that purpose.

As an article of food for hogs or other animals, the whey, after being subjected to my process, is more valuable than when used before being subjected to said process.

What I claim is—

The manufacturing of butter from whey, substantially in the manner herein described.

In witness whereof I have hereunto subscribed my name in the presence of two witnesses.

JAMES SUGGETT.

Witnesses:
    J. H. PALMER,
    O. B. SMITH.